(12) United States Patent
Lai et al.

(10) Patent No.: US 10,869,035 B2
(45) Date of Patent: Dec. 15, 2020

(54) ENCODING AND DECODING METHODS AND APPARATUSES WITH MULTIPLE IMAGE BLOCK DIVISION MANNERS

(71) Applicants: Huawei Technologies Co., Ltd., Guangdong (CN); Tsinghua University, Beijing (CN)

(72) Inventors: Changcai Lai, Hangzhou (CN); Xiaoran Cao, Beijing (CN); Yongbing Lin, Beijing (CN); Lingzhi Liu, Shenzhen (CN); Yun He, Beijing (CN)

(73) Assignees: Tsinghua University, Beijing (CN); Huawei Technologies Co., Ltd., Shenzhen (CN)

( * ) Notice: Subject to any disclaimer, the term of this patent is extended or adjusted under 35 U.S.C. 154(b) by 700 days.

(21) Appl. No.: 13/938,992

(22) Filed: Jul. 10, 2013

(65) Prior Publication Data
US 2013/0301707 A1 Nov. 14, 2013

Related U.S. Application Data

(63) Continuation of application No. PCT/CN2011/082003, filed on Nov. 9, 2011.

(30) Foreign Application Priority Data

Jan. 14, 2011 (CN) .......................... 2011 1 0007657

(51) Int. Cl.
*H04N 19/119* (2014.01)
*H04N 19/147* (2014.01)
(Continued)

(52) U.S. Cl.
CPC ......... *H04N 19/119* (2014.11); *H04N 19/124* (2014.11); *H04N 19/147* (2014.11);
(Continued)

(58) Field of Classification Search
CPC .. H04N 19/119; H04N 19/124; H04N 19/147; H04N 19/172; H04N 19/46; H04N 19/61
(Continued)

(56) References Cited

U.S. PATENT DOCUMENTS 9,386,324 B2 * 7/2016 Kim ..................... H04N 19/122
2004/0081238 A1 * 4/2004 Parhy ..................... H04N 19/51
375/240.16
(Continued)

FOREIGN PATENT DOCUMENTS

CN 101415121 A 4/2009
CN 101938657 A 1/2011
(Continued)

OTHER PUBLICATIONS

U.S. Appl. No. 61/391,473, Helle. filed Oct. 8, 2010.*
(Continued)

*Primary Examiner* — Farzana Hossain
(74) *Attorney, Agent, or Firm* — Leydig, Voit & Mayer, Ltd.

(57) ABSTRACT

An encoding method with multiple image block division manners is disclosed, including: determining a division manner and a division direction of an image block; dividing the image block to obtain image subblocks sequentially arranged horizontally or vertically; determining whether the image subblocks need subdivision, and if subdivision is not needed, predicting the encoding object in the frame according to the image subblocks, to obtain residual data; performing transformation, quantization, and entropy encoding for the residual data so as to obtain coded residual data; and writing the division manner of the image block, the division direction of the image block, an identifier indicating whether the image subblocks need subdivision, and the coded residual data into a bitstream. By applying the encoding
(Continued)

method, better prediction accuracy can be achieved when the image block presents a small change of pixel value in the horizontal or vertical direction.

26 Claims, 8 Drawing Sheets

(51) Int. Cl.
*H04N 19/124* (2014.01)
*H04N 19/172* (2014.01)
*H04N 19/46* (2014.01)
*H04N 19/61* (2014.01)

(52) U.S. Cl.
CPC .......... *H04N 19/172* (2014.11); *H04N 19/46* (2014.11); *H04N 19/61* (2014.11)

(58) Field of Classification Search
USPC .............................................. 375/240–241
See application file for complete search history.

(56) References Cited

U.S. PATENT DOCUMENTS

| | | | |
|---|---|---|---|
| 2005/0201462 A1 | 9/2005 | Ridge et al. | |
| 2005/0249291 A1 | 11/2005 | Gordon et al. | |
| 2006/0164560 A1* | 7/2006 | Watanabe | G06F 17/30811 348/700 |
| 2008/0101707 A1* | 5/2008 | Mukherjee | H04N 19/105 382/236 |
| 2009/0232211 A1 | 9/2009 | Chen et al. | |
| 2010/0195715 A1 | 8/2010 | Liu et al. | |
| 2011/0135000 A1* | 6/2011 | Alshina | H04N 19/105 375/240.13 |
| 2013/0287116 A1* | 10/2013 | Helle | H04N 19/00072 375/240.24 |

FOREIGN PATENT DOCUMENTS

| | | | | |
|---|---|---|---|---|
| WO | 2010039733 A2 | 4/2010 | | |
| WO | WO 2010039822 A2 | 4/2010 | | |
| WO | WO 2010/151018 | * 12/2010 | ....... | H04N 19/00175 |

OTHER PUBLICATIONS

International Search Report in corresponding International Patent Application No. PCT/CN2011/082003 (dated Feb. 16, 2012).

Written Opinion of the International Searching Authority in corresponding International Patent Application No. PCT/CN2011/082003 (dated Feb. 16, 2012).

"Series H: Audiovisual and Multimedia Systems; Infrastructure of Audiovisual Services—Coding of Moving Video," Mar. 2009, ITU-T, Geneva, Switzerland.

Sohn et al., "One Dimensional Transform for H.264 Based Intra Coding," 2009, IEEE, New York, New York.

Lim et al., "Description of video coding technology proposal," 92th Moving Pictures Expert Group Meeting & 1$^{st}$ Joint Collaborative Team on Video Coding Meeting, JCTVC-A113, Dresden, Germany, pp. 1-18 (Apr. 15-23, 2010).

Wien et al., "Hybrid Video Coding using Variable Size Block Transforms," Visual Communications and Image Processing 2002, Proceedings of SPIE, vol. 4671, pp. 1040-1051 (2002).

Lee et al., "A Hierarchical Variable-Sized Block Transform Coding Scheme for Coding Efficiency Improvement on H.264/AVC," 28$^{th}$ Picture Coding Symposium, PCS2010, Nagoya, Japan, pp. 522-525, Institute of Electrical and Electronics Engineers, New York, New York (Dec. 8-10, 2010).

McCann et al., "Samsung's Response to the Call for Proposals on Video Compression Technology," Joint Collaborative Team on Video Coding (JCT-VC) of ITU-T SG16 WP3 and ISO/IEC JTC1/SC29/WG11, JCTVC-A124, Dresden, Germany, pp. 1-42 (Apr. 15-23, 2010).

* cited by examiner

ENCODING AND DECODING METHODS AND APPARATUSES WITH MULTIPLE IMAGE BLOCK DIVISION MANNERS

CROSS-REFERENCE TO RELATED APPLICATIONS

This application is a continuation of International Patent Application No. PCT/CN2011/082003, filed on Nov. 9, 2011, which claims priority to Chinese Patent Application No. 201110007657.7, filed on Jan. 14, 2011, both of which are hereby incorporated by reference in their entireties.

TECHNICAL FIELD

The present invention relates to video encoding and decoding technologies, and in particular, to encoding and decoding methods and apparatuses with multiple image block division manners

BACKGROUND

The basic principle of video encoding and compression is to eliminate redundancy as far as possible by using correlation between space domain, time domain and a codeword. Currently, a popular practice is to implement video encoding and compression by performing steps such as prediction, transformation, quantization, and entropy encoding in a block-based hybrid video encoding framework. Such a block-based hybrid video encoding framework takes on exuberant vitality, and its application ranges from the earliest MPEG-1 to the latest video encoding standard H.264/AVC and even will encompass the next-generation video encoding and compression standard HEVC under development by the JCTVC workgroup (a workgroup jointly founded by MPEG and VECG).

Generally, video encoding and decoding is implemented by using a block-based space domain prediction encoding technology, and the basic principle is to eliminate space domain redundancy based on correlation between adjacent blocks, that is, predict the current block by using its adjacent block as a reference block. In the prior art, to improve accuracy of pixel prediction, a current image block is generally divided into four identical square image subblocks, and then prediction is performed by using each subblock as a unit and based on a pixel value of an adjacent block of the current image block. In some occasions, in order to further improve the prediction accuracy, one of the four image subblocks is subdivided into four smaller square image subblocks. For example, a 64×64 current image block may be divided into four 32×32 image subblocks; and a 32×32 image subblock may be divided into four 16×16 image subblocks.

Obviously, the image block division and prediction mode in the prior art is merely to divide an image block into four square image subblocks and predict the image subblock simply according to the adjacent block of the current image block. This manner lacks flexibility and hardly attains high prediction accuracy and good encoding and decoding effects.

SUMMARY

An embodiment of the present invention provides an encoding method with multiple image block division manners, including: determining a division manner of an encoding object in a current frame, where the division manner of the encoding object in the current frame includes square division and non-square division; determining, if the division manner of the encoding object in the current frame is non-square division, a division direction of the encoding object in the current frame, where the division direction includes horizontal division and vertical division; dividing the encoding object in the current frame according to the division manner and the division direction, to obtain image subblocks sequentially arranged horizontally or vertically; determining whether the image subblocks need subdivision, and if subdivision is not needed, predicting the encoding object in the frame according to the image subblocks, to obtain residual data; performing transformation, quantization, and entropy encoding for the residual data so as to obtain coded residual data; and writing into a bitstream the division manner of the encoding object in the current frame, the division direction of the encoding object in the current frame, an identifier indicating whether the image subblocks need subdivision, and the coded residual data, or, when the image subblocks are not further divisible into image subblocks of a preset size, writing an identifier of the division direction, an identifier of the division manner, and the coded residual data into a bitstream.

Further, another embodiment of the present invention provides an encoding method with multiple image block division manners, including: dividing an encoding object in a current frame by traversal and performing prediction encoding respectively; and among prediction encoding results, selecting the following information corresponding to a division process with a minimal code rate distortion cost: a division manner, a division direction, and whether image subblock needs subdivision, where the division manner includes square division and non-square division, and the division direction includes horizontal division and vertical division; dividing, according to the division direction if the division manner is non-square division, the encoding object in the current frame into image subblocks sequentially arranged horizontally or vertically; determining whether the image subblocks need subdivision, and if determining that the image subblocks need no subdivision, predicting the encoding object in the frame according to the image subblocks, to obtain residual data; performing transformation, quantization, and entropy encoding for the residual data so as to obtain coded residual data; and writing into a bitstream the division manner, the division direction, an identifier indicating whether the image subblocks need subdivision, and the coded residual data, or, when the image subblocks are not further divisible into image subblocks of a preset size, writing an identifier of the division manner, an identifier of the division direction, and the coded residual data into a bitstream.

Further, an embodiment of the present invention provides a corresponding decoding method with multiple image block division manners, including: parsing a bitstream to obtain a division manner and a division direction of a decoding object in a current frame, an identifier indicating whether image subblocks of the decoding object in the current frame need subdivision, and residual data of the decoding object in the current frame, where the division manner includes square division and non-square division, and the division direction includes vertical division and horizontal division; dividing the decoding object in the current frame according to the division manner and the division direction, to obtain image subblocks sequentially arranged horizontally or vertically; determining whether to subdivide the image subblocks according to the identifier indicating whether the image subblocks of the decoding object in the current frame need subdivision in the bitstream; and decoding the image subblocks according to the residual data if the identifier indicating whether the image subblocks of the decoding object in the current frame need subdivision indicates that the image subblocks need no subdivision, or if the image subblocks are not further divisible into image subblocks of a preset size.

Further, correspondingly, embodiments of the present invention provide an encoding apparatus and a decoding apparatus that apply the foregoing encoding method and decoding method.

Further, an embodiment of the present invention provides another decoding method for an intra-frame block in image decoding, including: obtaining a division manner of a decoding object in a current frame, a prediction mode of a prediction block under the division manner, and residual data of the decoding object; obtaining an identifier indicating whether to subdivide a transformation block of the prediction block, and obtaining a size of the transformation block of the prediction block according to the identifier and a division manner of the prediction block; using a transformation matrix of the size to transform the residual data and obtain transformed residual data; using the prediction mode to obtain infra-frame prediction data of the prediction block; and using the prediction data and the residual data to decode the intra-frame block.

In the decoding method provided in the embodiment, the encoding object in the frame is divided into image subblocks sequentially arranged horizontally or vertically; when the image subblocks need subdivision, the image subblocks may be divided into multiple square blocks of a predefined size, or multiple rectangular blocks whose width is unequal to height or length; when the width is greater than the height, the image subblocks are divided horizontally; when the width is less than the height, the image subblocks are divided vertically.

According to the encoding method and the decoding method provided in the embodiments of the present invention, during image block division, an image block is divided into rectangular image subblocks horizontally or vertically, so that better prediction accuracy can be achieved when the image block presents a small change of pixel value in the horizontal or vertical direction.

DESCRIPTION OF EMBODIMENTS

Figure 1:
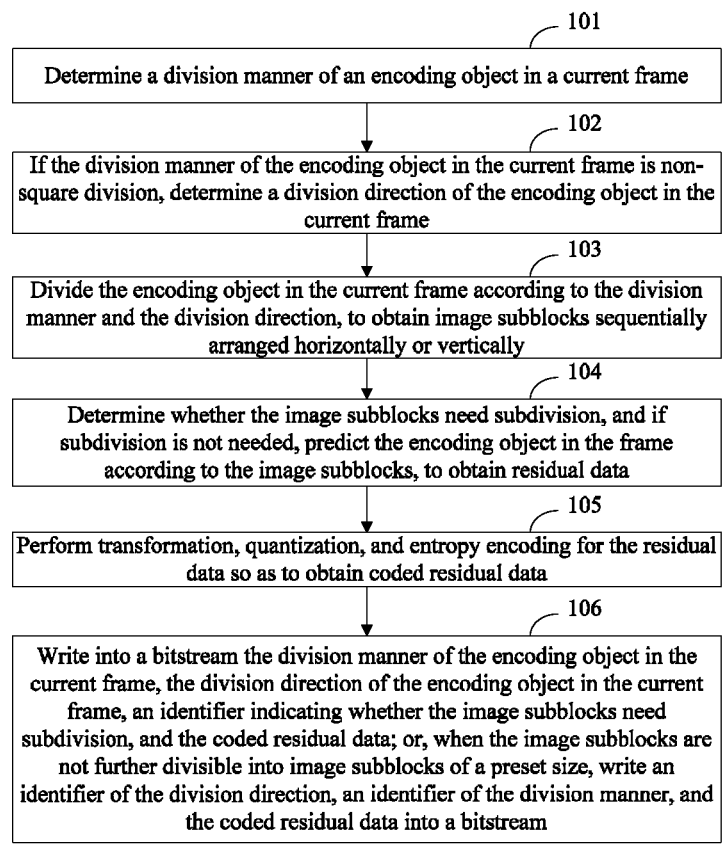
FIG. 1 is a schematic diagram of an encoding method with multiple image block division manners according to an embodiment of the present invention.

Referring to FIG. 1, an embodiment of the present invention provides an encoding method with multiple image block division manners, including the following steps:

Step 101: Determine a division manner of an encoding object in a current frame.

In the embodiment of the present invention, the division manner of the encoding object in the current frame includes square division and non-square division.

In the embodiment of the present invention, the square division refers to dividing the encoding object in the current frame into four square image subblocks of the same size.

The non-square division refers to dividing the encoding object in the current frame into vertically or horizontally arranged image subblocks of the same shape. Evidently, in the embodiment of the present invention, rectangular image subblocks are preferred. For example, an N×N image block is divided into several M×N or N×M image subblocks, where M and N are positive integers greater than 1, N is an integer multiple of M, and in the embodiment of the present invention, N is four times greater than M. Even the N×N image block is divided into several 1×N or N×1 linear image subblocks. Nevertheless, persons skilled in the art may consider dividing the encoding object in the current frame into image subblocks of other shapes that may be "sequentially arranged".

In the embodiment of the present invention, the encoding object in the current frame may be a 32×32 image block, or an image subblock of a 32×32 image block, or an image subblock of a smaller image block.

Step 102: If the division manner of the encoding object in the current frame is non-square division, determine a division direction of the encoding object in the current frame.

Figure 2:
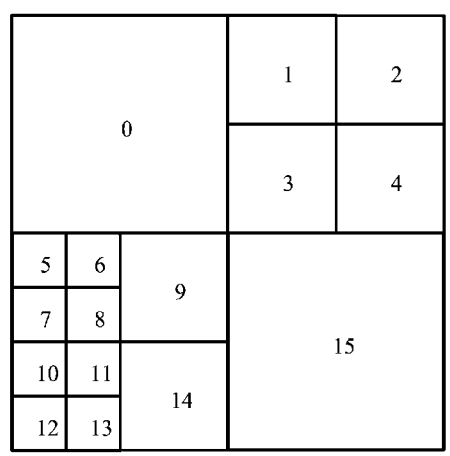
FIG. 2 is a schematic diagram of square division.

Specifically, referring to FIG. 2 first, FIG. 2 is a schematic diagram of square division, which refers to dividing the encoding object in the current frame into four square image subblocks according to the division method in the prior art. The image subblocks that derive from the square division are squares of an equal size, respectively located at four corners of the encoding object in the current frame. It can be seen that, the image block shown in FIG. 2 is divided into four square image subblocks, and the image subblock in its upper right corner is further divided into secondary square image subblocks 1, 2, 3, and 4.

Figure 3:
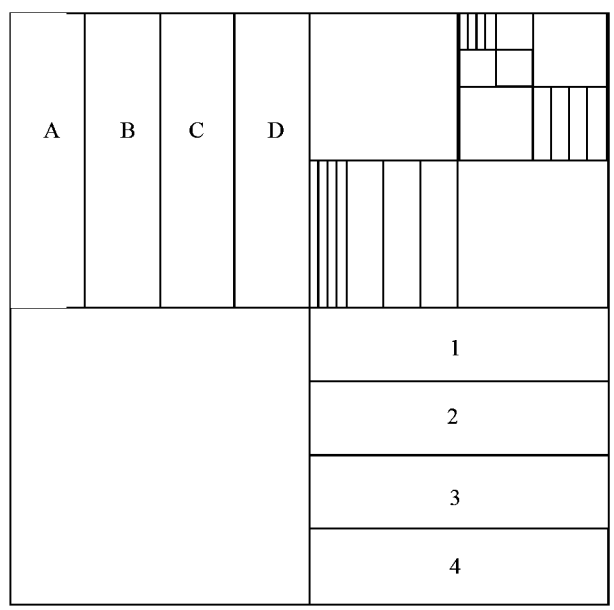
FIG. 3 is a schematic diagram of non-square division.

In the embodiment of the present invention, non-square division further includes horizontal division and vertical division from the perspective of division direction. Referring to FIG. 3, FIG. 3 is a schematic diagram of the non-square division described in the embodiment of the present invention. In the embodiment of the present invention, the non-square division includes vertical division and horizontal division. The image subblock in the lower right corner of the image block shown in FIG. 3 is horizontally divided into image subblocks 1, 2, 3, and 4. In the embodiment of the present invention, horizontal division refers to dividing the encoding object in the current frame into multiple image subblocks of the same shape arranged vertically. The upper left block of the image block shown in FIG. 3 is vertically divided into four image subblocks A, B, C, and D. In the embodiment of the present invention, vertical division refers to dividing the current image block into multiple image subblocks of the same shape arranged horizontally.

Step 103: Divide the encoding object in the current frame according to the division manner and the division direction, to obtain image subblocks sequentially arranged horizontally or vertically.

Step 104: Determine whether the image subblocks need subdivision, and if subdivision is not needed, predict the encoding object in the frame according to the image subblocks, to obtain residual data; otherwise, subdivide the image subblocks according to the predefined size. As shown in FIG. 3, a 4×16 image block is subdivided into four 1×16 blocks.

Step 105: Perform transformation, quantization, and entropy encoding for the residual data so as to obtain coded residual data.

Step 106: Write into a bitstream the division manner of the encoding object in the current frame, the division direction of the encoding object in the current frame, an identifier indicating whether the image subblocks need subdivision, and the coded residual data; or, when the image subblocks are not further divisible into image subblocks of a preset size, write an identifier of the division direction, an identifier of the division manner, and the coded residual data into a bitstream.

In the embodiment of the present invention, the writing into a bitstream the division manner, the division direction, and an identifier indicating whether the image subblocks need subdivision, includes:

writing into a bitstream the identifier of the division manner, the identifier of the division direction, and the identifier indicating whether the image subblocks need subdivision.

Alternatively, in other optional embodiments, the writing into a bitstream the division manner, the division direction, and an identifier indicating whether the image subblocks need subdivision may include:

searching a corresponding combination list to obtain a corresponding index value according to the division manner, the division direction, and whether the image subblocks need subdivision; and writing the index value into the bitstream.

Alternatively, the writing into a bitstream the division manner, the division direction, and an identifier indicating whether the image subblocks need subdivision may include:

searching a corresponding combination list to obtain a corresponding index value according to the division manner and the division direction; and writing the index value and the identifier indicating whether the image subblocks need subdivision into the bitstream.

In an optional embodiment, the writing an identifier of the division direction, an identifier of the division manner, and the coded residual data into a bitstream may include:

writing the identifier of the division manner and the identifier of the division direction into the bitstream; or searching a corresponding combination list to obtain a corresponding index value according to the division manner and the division direction, and writing the index value into the bitstream.

In the embodiment of the present invention, the identifier indicating whether the image subblocks need subdivision may be a bit such as 0 or 1 for indicating whether all the image subblocks need subdivision. The identifier indicating whether the image subblocks need subdivision may also be multiple bits that are respectively used for indicating whether respective image subblocks need subdivision. Alternatively, the identifier indicating whether the image subblocks need subdivision may also be an index value that corresponds to a combination of information indicating whether each of the image subblocks needs subdivision. Evidently, if it is determined that the image subblocks need subdivision, the subdivision is only a process of repeating steps 101, 102, and 103 for the image subblocks by taking the image subblocks as encoding objects in the current frame, until the image subblocks need no subdivision. The process is cyclic, for example:

The determining whether the image subblocks need subdivision includes:

dividing an image subblock into secondary image subblocks of different sizes according to preset image subblock sizes, and determining that the image subblocks need no subdivision if a code rate distortion cost sum of encoding all secondary image subblocks of the multiple sizes is greater than a code rate distortion cost of directly encoding the image subblocks that are no longer subdivided; and determining whether the image subblocks are further divisible into image subblocks of a preset size; and if not divisible, determining that the image subblocks need no subdivision, where, in practical application, both an encoder and a decoder may have preset image block sizes, and an image block is divisible only if the image block is divisible into such sizes or only if the size of the image block is greater than the preset sizes; when image subblocks need no division for this reason, the encoder may choose not to write the identifier indicating whether the image subblocks need subdivision into the bitstream.

Figure 4:
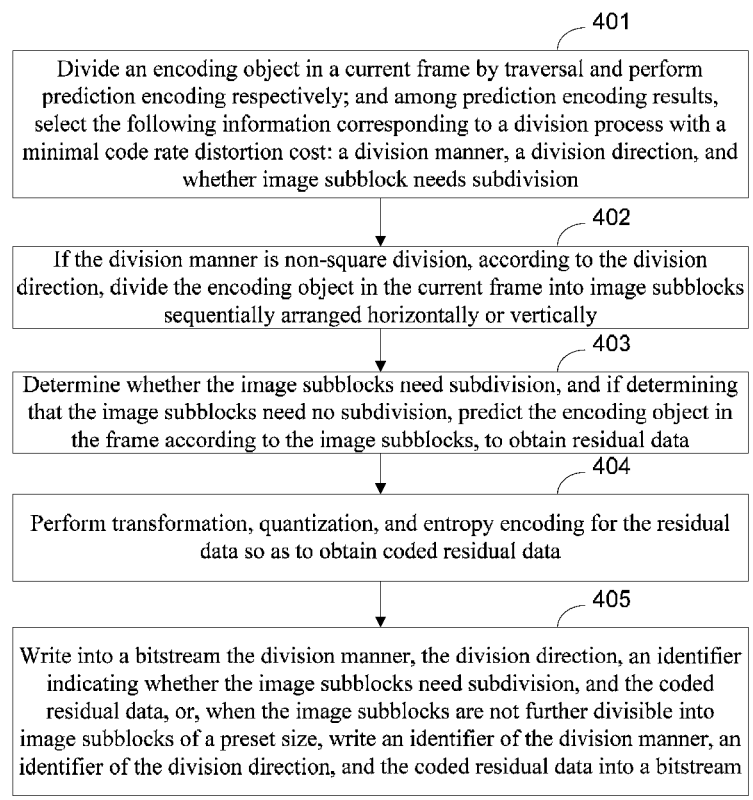
FIG. 4 is a schematic diagram of an encoding method with multiple image block division manners according to another embodiment of the present invention.

In the embodiment of the present invention, the division manner and the division direction of the encoding object in the current frame, and whether the image subblocks need subdivision may be determined in a conventional manner of traversal or partial traversal. The traversal or partial traversal refers to attempting all or some possibilities of the division manner, the division direction, and whether the image subblocks need subdivision; or, presetting some probable combinations according to characteristics of the current encoding object, traversing the combinations, performing pixel prediction, and selecting a combination that brings the optimal encoding performance of encoding the current encoding object, and then encoding the encoding object in the current frame according to the division manner, the division direction, and whether the image subblock need subdivision in the optimal combination. Traversal is a common determining method for the prediction direction and the image block division in the video encoding and decoding field. The traversal simply makes attempts and selects the optimal results of the attempts, and is not detailed here any further. However, correspondingly, from another perspective, referring to FIG. 4, an encoding method with multiple image block division manners according to another embodiment of the present invention may include the following steps:

Step 401: Divide an encoding object in a current frame by traversal and perform prediction encoding respectively; and among prediction encoding results, select the following information corresponding to a division process with a minimal code rate distortion cost: a division manner, a division direction, and whether image subblock needs subdivision.

The division manner includes square division and non-square division, and the division direction includes horizontal division and vertical division.

Step 402: If the division manner is non-square division, according to the division direction, divide the encoding object in the current frame into image subblocks sequentially arranged horizontally or vertically; if the division direction is horizontal division, divide the encoding object in the current frame into multiple image subblocks of the same shape arranged vertically; if the division direction is vertical division, divide the encoding object in the current frame into multiple image subblocks of the same shape arranged horizontally.

Step 403: Determine whether the image subblocks need subdivision, and if determining that the image subblocks need no subdivision, predict the encoding object in the frame according to the image subblocks, to obtain residual data.

Step 404: Perform transformation, quantization, and entropy encoding for the residual data so as to obtain coded residual data.

Step 405: Write into a bitstream the division manner, the division direction, an identifier indicating whether the image subblocks need subdivision, and the coded residual data, or, when the image subblocks are not further divisible into image subblocks of a preset size, write an identifier of the division manner, an identifier of the division direction, and the coded residual data into a bitstream.

If the bitstream does not include an identifier indicating whether the image subblocks need subdivision, it indicates that the corresponding image subblocks are not further divisible into image subblocks of the preset size.

Certainly, persons of ordinary skill in the art should understand that when the encoder performs traversal or prediction for the image subblocks, the encoder needs to record the prediction direction of each image subblock, determine a reference image block of the image subblock, perform prediction according to the prediction direction and the pixel value of the reference image block, and finally, write the prediction direction into the bitstream so that the decoder can perform the same prediction process. Such processes involve detailed pixel prediction methods, and can be performed solely according to the prior art. They are not related to the subject matter of the present invention, and are not detailed here any further.

To sum up, in the encoding method with multiple image block division manners according to the embodiment of the present invention, during image block division, an image block is divided into rectangular image subblocks arranged horizontally or vertically, so that when the image block presents a small change of pixel value in the horizontal or vertical direction, better prediction accuracy can be achieved compared with the division manner in the prior art which simply divides the image block into square image subblocks at four corners.

Figure 5:
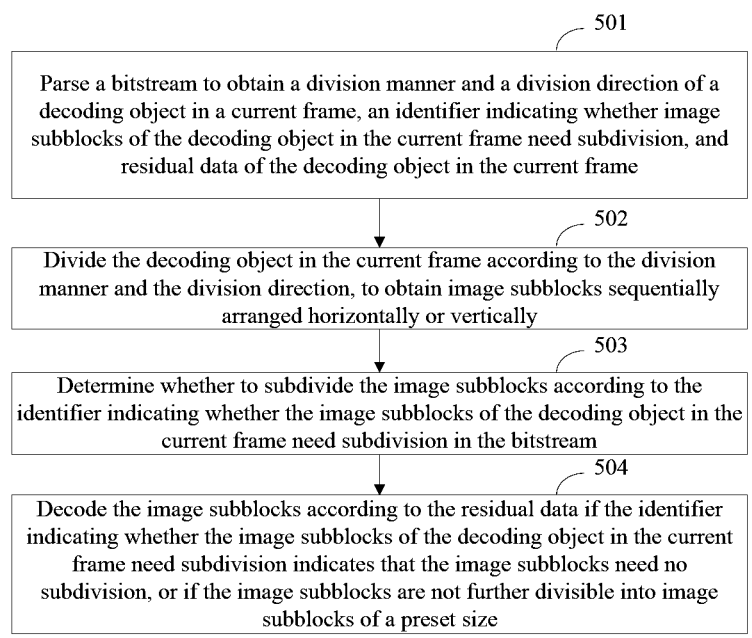
FIG. 5 is a schematic diagram of a decoding method with multiple image block division manners according to an embodiment of the present invention.

Further, an embodiment of the present invention provides a corresponding decoding method. Referring to FIG. 5, the decoding method with multiple image block division manners according to the embodiment of the present invention includes the following steps:

Step 501: Parse a bitstream to obtain a division manner and a division direction of a decoding object in a current frame, an identifier indicating whether image subblocks of the decoding object in the current frame need subdivision, and residual data of the decoding object in the current frame.

The division manner includes square division and non-square division, and the division direction includes vertical division and horizontal division.

In the embodiment of the present invention, the square division refers to dividing the decoding object in the current frame into four square image subblocks of the same size.

The non-square division refers to dividing the decoding object in the current frame into vertically or horizontally arranged image subblocks of the same shape. Evidently, in the embodiment of the present invention, rectangular image subblocks are preferred. Nevertheless, persons skilled in the art may consider dividing the decoding object in the current frame into image subblocks of other shapes that may be "arranged sequentially".

Besides, understandably, if the bitstream does not include an identifier indicating whether the image subblocks of the decoding object in the current frame need subdivision, it may be construed as no need of subdividing the corresponding image subblocks, or construed as the corresponding image subblocks being not divisible into image subblocks of a preset size. In this case, it is not necessary to obtain the identifier indicating whether the image subblocks of the decoding object in the current frame need subdivision.

In the embodiment of the present invention, the parsing a bitstream to obtain a division manner and a division direction of a decoding object in a current frame, and an identifier indicating whether image subblocks of the decoding object in the current frame need subdivision, includes:

parsing the bitstream to obtain an identifier of the division manner, an identifier of the division direction, and the identifier indicating whether the image subblocks need subdivision; or parsing the bitstream and searching a corresponding combination list for an index value according to the division manner, the division direction, and whether the image subblocks need subdivision, and searching, according to the index value, for corresponding information on the division manner, division direction, and whether the image subblocks need subdivision; or parsing the bitstream to obtain an identifier indicating whether the image subblocks need subdivision and obtain an index value in a combination list corresponding to the division manner and the division direction, and obtaining information on the division manner and the division direction according to the index value.

Step 502: Divide the decoding object in the current frame according to the division manner and the division direction, to obtain image subblocks sequentially arranged horizontally or vertically.

If the division manner is non-square division and the division direction is horizontal division, the decoding object in the current frame is divided into multiple image subblocks of the same shape arranged vertically; if the division manner is non-square division and the division direction is vertical division, the decoding object in the current frame is divided into multiple image subblocks of the same shape arranged horizontally.

Step 503: Determine whether to subdivide the image subblocks according to the identifier indicating whether the image subblocks of the decoding object in the current frame need subdivision in the bitstream.

Step 504: Decode the image subblocks according to the residual data if the identifier indicating whether the image subblocks of the decoding object in the current frame need subdivision indicates that the image subblocks need no subdivision, or if the image subblocks are not further divisible into image subblocks of a preset size; otherwise, subdivide the image subblocks according to another predefined size. As shown in FIG. 3, a 4×16 image block is subdivided into four 1×16 smaller blocks.

Figure 6:
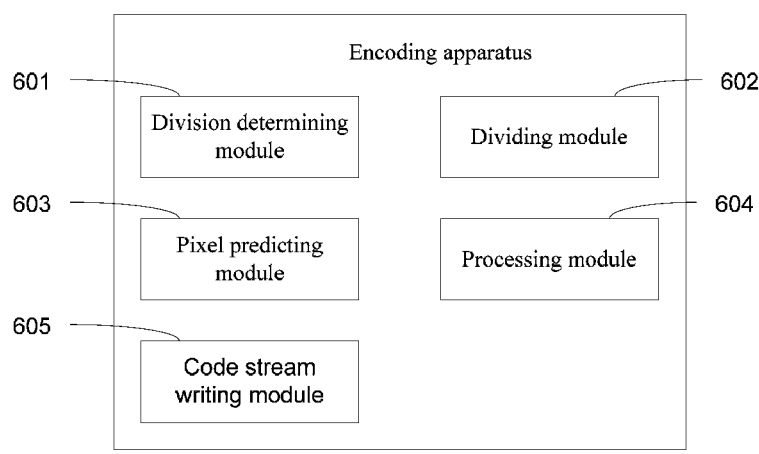
FIG. 6 is a schematic diagram of an encoding apparatus according to an embodiment of the present invention.

Further, correspondingly, the present invention provides an encoding apparatus that applies the encoding method of the present invention. Referring to FIG. 6, FIG. 6 is a schematic diagram of an encoding apparatus according to an embodiment of the present invention. The encoding apparatus provided in the embodiment of the present invention includes:

- a division determining module 601, configured to: divide an encoding object in a current frame by traversal and perform prediction encoding respectively; and among prediction encoding results, select the following information corresponding to a division process with a minimal code rate distortion cost: a division manner, a division direction, and whether image subblock needs subdivision, where the division manner includes square division and non-square division, and the division direction includes horizontal division and vertical division;
- a dividing module 602, configured to: if the division manner is non-square division, according to the division direction, divide the encoding object in the current frame into image subblocks sequentially arranged horizontally or vertically; if the division direction is horizontal division, divide the encoding object in the current frame into multiple image subblocks of the same shape arranged vertically; if the division direction is vertical division, divide the encoding object in the current frame into multiple image subblocks of the same shape arranged horizontally;
- a pixel predicting module 603, configured to: determine whether the image subblocks need subdivision, and if determining that the image subblocks need no subdivision, predict the encoding object in the frame according to the image subblocks, to obtain residual data; otherwise, subdivide the image subblocks according to another predefined size, and for example, as shown in FIG. 3, a 4×16 image block is subdivided into four 1×16 smaller blocks; and
- a processing module 604, configured to perform transformation, quantization, and entropy encoding for the residual data so as to obtain coded residual data; and
- a bitstream writing module 605, configured to: write into a bitstream the division manner, the division direction, an identifier indicating whether the image subblocks need subdivision, and the coded residual data; or, when the image subblocks are not further divisible into image subblocks of a preset size, write an identifier of the division manner, an identifier of the division direction, and the coded residual data into a bitstream.

Certainly, to facilitate decoding, the pixel predicting module 603 is further configured to obtain a prediction direction of the prediction for the image subblocks. Correspondingly, the bitstream writing module 605 is further configured to write the prediction direction into the bitstream.

Figure 7:
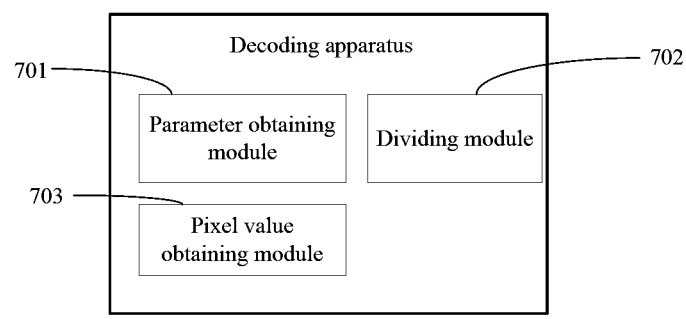
FIG. 7 is a schematic diagram of a decoding apparatus according to an embodiment of the present invention.

Further, an embodiment of the present invention provides a corresponding decoding apparatus. Referring to FIG. 7, the decoding apparatus according to the embodiment of the present invention includes:

- a parameter obtaining module 701, configured to parse a bitstream to obtain a division manner and a division direction of a decoding object in a current frame, an identifier indicating whether image subblocks of the decoding object in the current frame need subdivision, and residual data of the decoding object in the current frame, where the division manner includes square division and non-square division, and the division direction includes vertical division and horizontal division;
- a dividing module 702, configured to divide the decoding object in the current frame according to the division manner and the division direction, to obtain image subblocks sequentially arranged horizontally or vertically; and determine whether to subdivide the image subblocks according to the identifier indicating whether the image subblocks of the decoding object in the current frame need subdivision in the bitstream, where if the division manner is non-square division and the division direction is horizontal division, the decoding object in the current frame is divided into multiple image subblocks of the same shape arranged vertically; if the division manner is non-square division and the division direction is vertical division, the decoding object in the current frame is divided into multiple image subblocks of the same shape arranged horizontally; and
- a pixel value obtaining module 703, configured to: decode the image subblocks according to the residual data if the identifier indicating whether the image subblocks of the decoding object in the current frame need subdivision indicates that the image subblocks need no subdivision, or if the image subblocks are not further divisible into image subblocks of a preset size; otherwise, subdivide the image subblocks according to another predefined size. As shown in FIG. 3, a 4×16 image block is subdivided into four 1×16 smaller blocks.

Certainly, in the embodiment of the present invention, the parameter obtaining module 701 is further configured to obtain a prediction direction of the image subblocks from the bitstream. The pixel value obtaining module 703 decodes the image subblocks according to the prediction direction and the coded residual data.

Figure 8:
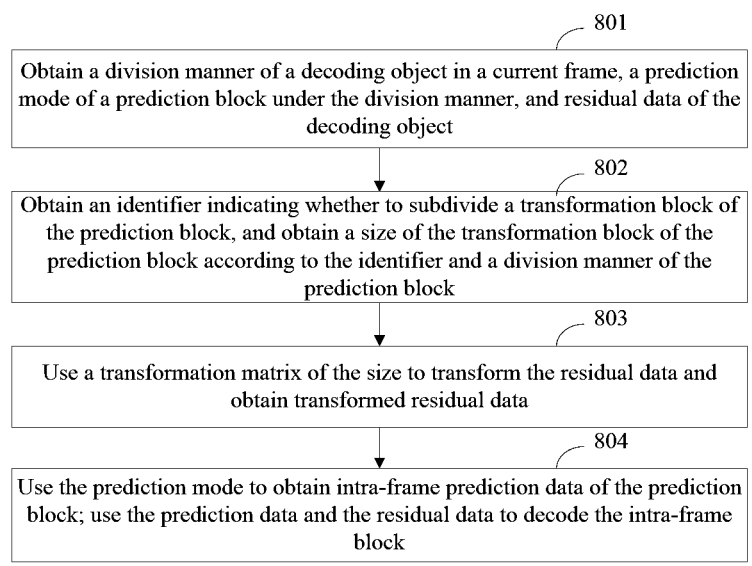
FIG. 8 is a schematic diagram of a decoding method with multiple image block division manners according to another embodiment of the present invention.

Further, an embodiment of the present invention provides another decoding method. As shown in FIG. 8, the decoding method includes the following steps:

Step 801: Obtain a division manner of a decoding object in a current frame, a prediction mode of a prediction block under the division manner, and residual data of the decoding object.

The division manner includes square division and non-square division, and the division direction includes vertical division and horizontal division. In the embodiment of the present invention, the square division refers to dividing the decoding object in the current frame into four square image subblocks of the same size. The non-square division refers to dividing the decoding object in the current frame into vertically or horizontally arranged image subblocks of the same shape. Evidently, in the embodiment of the present invention, rectangular image subblocks are preferred. Nevertheless, persons skilled in the art may consider dividing the decoding object in the current frame into image subblocks of other shapes that may be "sequentially arranged". If the division direction is horizontal division, the encoding object in the current frame is divided into image subblocks of the same shape arranged vertically; if the division direction is vertical division, the encoding object in the current frame is divided into image subblocks of the same shape arranged horizontally.

Step 802: Obtain an identifier indicating whether to subdivide a transformation block of the prediction block, and obtain a size of the transformation block of the prediction block according to the identifier and a division manner of the prediction block.

If the transformation division identifier indicates that the transformation block needs subdivision and the prediction block employs square division, multiple square transformation matrixes smaller than the divided prediction block are obtained. For example, once division is performed, new transformation blocks are obtained, and their size is half of the size of the undivided transformation block.

If the transformation division identifier indicates that the transformation block needs subdivision and the prediction block employs non-square division, multiple non-square transformation matrixes smaller than the divided prediction block are obtained. For example, if the prediction block is divided into horizontally arranged image subblocks of the same size, multiple non-square transformation blocks smaller than the divided prediction block are obtained, with width smaller than height; if the prediction block is divided into vertically arranged image subblocks of the same size, multiple non-square transformation blocks smaller than the divided prediction block are obtained, with width greater than height. According to the preset division manner, the transformation block may be divided into blocks, with width being smaller than the width of the undivided transformation block, and height unchanged; or, with unchanged width and smaller height; or with smaller width and smaller height.

The divided transformation blocks may be arranged in the following manner The non-square transformation blocks are sequentially arranged horizontally or vertically in the prediction block of the division manner, as shown in FIG. 3, or are arranged zigzag in the prediction block of the division manner, as shown by the non-square subblocks inside the non-square image block, which are arranged zigzag in FIG. 8 or FIG. 9, where the subblocks may be transformation blocks or prediction blocks.

If the transformation division identifier indicates that the transformation block needs no subdivision, the size of the transformation block of the prediction block is obtained according to division hierarchy of the transformation and the division manner of the prediction block. The final size of the transformation block is obtained after the blocks are divided several times according to preset rules of dividing the transformation block.

When no transformation division identifier exists, the transforming unit does not need to perform further division, and the transformation blocks of the same size as the prediction block or the image subblock are applied; if the prediction block is a square block, square transformation blocks of the same size are obtained; if the prediction block is a non-square block, non-square transformation blocks of the same size as the prediction block are obtained.

Optionally, if the decoding object is divided into non-square prediction blocks whose width is unequal to height, the transformation division identifier may indicate by default that the transformation block needs no more division, the size of the transformation block of the prediction block is the size of the prediction block under the division manner, and the transformation division identifier does not necessarily exist in the bitstream.

Step 803: Use a transformation matrix of the size to transform the residual data and obtain transformed residual data. The detailed transformation process is covered in the prior art, and is not detailed herein any further.

Step 804: Use the prediction mode to obtain intra-frame prediction data of the prediction block; use the prediction data and the residual data to decode the intra-frame block; according to the size of the transformation block and the prediction mode, obtain a prediction block composed of predicted pixel values of the size in the prediction block, and perform a reconstructive decoding operation for the prediction data in the prediction block and the transformed residual data.

Figure 9:
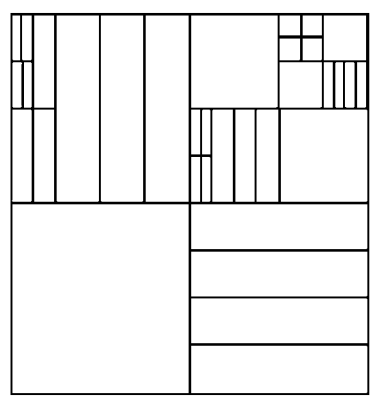
FIG. 9 and FIG. 10 are other schematic diagrams of non-square division.
Figure 10:
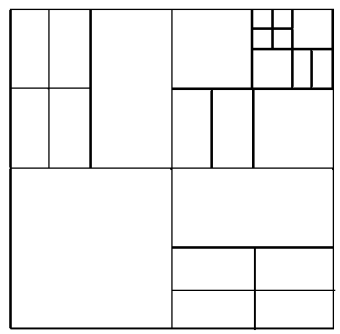

In the embodiment, the encoding object in the frame is divided into image subblocks sequentially arranged horizontally or vertically; when the image subblocks need subdivision, the image subblocks may be subdivided in different manners When the image subblocks need subdivision, the image subblocks may not only be divided into multiple rectangular blocks sequentially arranged horizontally or vertically, as shown in FIG. 3, but also be divided in other manners shown in FIG. 9 and FIG. 10. The image subblocks may be divided into multiple square blocks according to predefined sizes, or divided into multiple rectangular blocks whose width is unequal to height or length; when the width is greater than the height, the division manner of the image subblocks is a horizontal division manner; when the width is less than the height, the division manner of the image subblocks is a vertical division manner.

According to the description of the foregoing embodiments, persons skilled in the art may clearly understand that the present invention may be implemented by software plus a necessary universal hardware platform or by hardware only. In most circumstances, the former is preferred. Based on such an understanding, the technical solutions in the present invention essentially, or the part contributing to the prior art may be implemented in the form of a software product. The computer software product is stored in a storage medium, such as a ROM/RAM, a magnetic disk, and an optical disk, and includes several instructions for instructing a computer device (which may be a personal computer, a server, or a network device) to perform all or a part of steps of the methods described in the embodiments of the present invention.

The foregoing descriptions are merely exemplary embodiments of the present invention. It should be noted that various improvements and modifications made by persons of ordinary skill in the art without departing from the principle of the present invention shall fall within the protection scope of the present invention.

What is claimed is:

1. An encoding method with multiple image block division manners, comprising:
   determining a division manner of an encoding object in a current frame, wherein the division manner results in subblocks that are each one of a square image subblock or a rectangular image subblock;
   determining, when the division manner of the encoding object in the current frame is non-square division, a division direction of the encoding object in the current frame, wherein the division direction comprises horizontal division and vertical division;
   dividing the encoding object in the current frame according to the division manner and the division direction, to obtain first image subblocks sequentially arranged horizontally or vertically;
   dividing ones of the first image subblocks, as individual subblocks by:
      horizontally dividing a one of the first image subblocks where a width of the one of the first image subblocks is greater than a height of the one of the first image subblocks; and
      vertically dividing the one of the first image subblocks where the width is less than the height; and
   writing, into a bitstream, an identifier indicating the image subblocks need subdivision.

2. The encoding method according to claim 1, further comprising:
   obtaining information on a prediction direction of the first image subblocks, and writing the information on the prediction direction into the bitstream.

3. The encoding method according to claim 1, wherein the dividing the encoding object in the current frame according to the division manner and the division direction, to obtain the first image subblocks sequentially arranged horizontally or vertically comprises:

dividing, when the division manner is the non-square division and the division direction is horizontal division, the encoding object in the current frame into image subblocks arranged of the same shape vertically; or dividing, when the division manner is the non-square division and the division direction is vertical division, the encoding object in the current frame into image subblocks of the same shape arranged horizontally.

4. The encoding method according to claim 1, further comprising: before dividing the first image subblocks, determining whether the first image subblocks need the subdivision, including:

dividing an image subblock into secondary image subblocks of multiple sizes according to preset image subblock sizes, and determining that the first image subblocks need no subdivision when a code rate distortion cost sum of encoding all the secondary image subblocks of the multiple sizes is greater than a code rate distortion cost of directly encoding the first image subblocks that are no longer subdivided; or determining whether the first image subblocks are further divisible into second image subblocks of a preset size; and when the first image subblocks are not divisible, determining that the first image subblocks need no subdivision.

5. A decoding method for an image block, the method comprising:

determining, by a decoder, that the image block needs to be divided by parsing a bitstream;

obtaining, by the decoder, a division direction for the image block, wherein a size of the image block is expressed in W×H, with W representing a width of the image block and H representing a height of the image block;

dividing the image block, by the decoder and based on the division direction, to obtain four rectangular image subblocks, wherein a size of each of the four rectangular image subblocks is W×H/4 or W/4×H; and reconstructing the image block based on the four rectangular image subblocks.

6. An encoding method with multiple image block division manners, comprising:

dividing an encoding object in a current frame by traversal and performing prediction encoding respectively; and among prediction encoding results, selecting the following information corresponding to a division process with a minimal code rate distortion cost: a division manner, a division direction, and whether first image subblock needs subdivision, wherein the division manner results in subblocks that are each one of a square image subblock or a rectangular image subblock;

dividing, according to the division direction when the division manner is non-square division, the encoding object in the current frame into image subblocks sequentially arranged horizontally or vertically;

dividing ones of the first image subblocks, as individual subblocks by:

horizontally dividing a one of the first image subblocks where a width of the one of the first image subblocks is greater than a height of the one of the first image subblocks; and vertically dividing the one of the first image subblocks where the width is less than the height; and writing an identifier indicating the image subblocks need subdivision into the bitstream.

7. The encoding method according to claim 6, further comprising:

obtaining information on a prediction direction of the prediction, and writing the information on the prediction direction into the bitstream.

8. The encoding method according to claim 6, wherein the dividing the encoding object in the current frame into image subblocks sequentially arranged horizontally or vertically comprises:

dividing, when the division direction is horizontal division, the encoding object in the current frame into image subblocks of the same shape arranged vertically; or dividing, when the division direction is vertical division, the encoding object in the current frame into image subblocks of the same shape arranged horizontally.

9. The encoding method according to claim 6, further comprising: before dividing the first image subblocks, determining that the image subblocks need no subdivision, including:

dividing an image subblock into secondary image subblocks of multiple sizes according to preset image subblock sizes, and determining that the image subblocks need no subdivision when a code rate distortion cost sum of encoding secondary image subblocks of the multiple sizes is greater than a code rate distortion cost of directly encoding the first image subblocks that are no longer subdivided; and determining whether the first image subblocks are further divisible into second image subblocks of a preset size; and when the first image subblocks are not divisible, determining that the first image subblocks need no subdivision.

10. The encoding method according to claim 9, wherein when the bitstream contains no identifier indicating that the image subblocks need subdivision, the image subblocks need no subdivision.

11. A non-transitory computer readable medium including computer-executable instructions for execution on an encoding apparatus, such that when the computer-executable instructions are executed by the apparatus a method is carried out comprising:

dividing an encoding object in a current frame by traversal and performing prediction encoding respectively; and among prediction encoding results, selecting the following information corresponding to a division process with a minimal code rate distortion cost: a division manner, a division direction, and whether image subblock needs subdivision, wherein the division manner results in subblocks that each one of a square image subblock or a rectangular image subblock;

dividing, according to the division direction when the division manner is non-square division, the encoding object in the current frame into first image subblocks sequentially arranged horizontally or vertically;

dividing ones of the first image subblocks, as individual subblocks by:

horizontally dividing a one of the first image subblocks where a width of the one of the first image subblocks is greater than a height of the one of the first image subblocks; and vertically dividing the one of the first image subblocks where the width is less than the height; and writing into a bitstream an identifier indicating the image subblocks need subdivision.

12. The non-transitory computer readable medium according to claim 11, further including computer-executable instructions comprising determining a prediction direction of the prediction for the first image subblocks, and writing the prediction direction into the bitstream.

13. The non-transitory computer readable medium according to claim 11, further including computer-executable instructions comprising:

dividing, when the division direction is horizontal division, the encoding object in the current frame into image subblocks of the same shape arranged vertically; and dividing, when the division direction is vertical division, the encoding object in the current frame into image subblocks of the same shape arranged horizontally.

14. The non-transitory computer readable medium according to claim 11, further including computer-executable instructions comprising:

writing an identifier of the division manner, an identifier of the division direction, and an identifier indicating whether the image subblocks need subdivision into the bitstream; and writing the index value and the identifier indicating whether the image subblocks need subdivision, the identifier of the division manner, and the identifier of the division direction into the bitstream.

15. A non-transitory computer readable medium storing computer-executable instructions for execution on a decoding apparatus for an image block, such that when executed by a processor of the decoding apparatus, the instructions cause the decoding apparatus to perform the steps of:

determining that the image block needs to be divided by parsing a bitstream;

obtaining a division direction for the image block, wherein a size of the image block is expressed in W×H, with W representing a width of the image block and H representing a height of the image block;

dividing the image block based on the division direction, to obtain four rectangular image subblocks, wherein a size of each of the four rectangular image subblocks is W×H/4 or W/4×H; and reconstructing the image block based on the four rectangular image subblocks.

16. A decoding method for an intra-frame block in image decoding, comprising:

obtaining corresponding information on a division manner of a decoding object in a current frame, and an identifier indicating to subdivide a transformation block of the prediction block, and the division manner results in subblocks that are each one of a square image subblock or a rectangular image subblock; wherein an image subblock is further divided horizontally when a width of an image subblock is greater than its height, and the image subblock is divided vertically when the width is less than the height;

obtaining a prediction mode of a prediction block under the division manner, and residual data of the decoding object; obtaining a size of the transformation block of the prediction block according to the identifier and a division manner of the prediction block;

using a transformation matrix of the size to transform the residual data and obtain transformed residual data;

using the prediction mode to obtain infra-frame prediction data of the prediction block; and using the prediction data and the residual data to decode the intra-frame block.

17. The decoding method according to claim 16, wherein the obtaining the identifier indicating to subdivide the transformation block of the prediction block, and obtaining the size of the transformation block of the prediction block according to the identifier and the division manner of the prediction block comprises:

obtaining multiple square transformation matrices smaller than the divided prediction block when the transformation division identifier indicates that the transformation block needs subdivision and the prediction block employs square division.

18. The decoding method according to claim 16, wherein the obtaining the identifier indicating to subdivide the transformation block of the prediction block, and obtaining the size of the transformation block of the prediction block according to the identifier and the division manner of the prediction block comprises:

obtaining multiple non-square transformation matrices smaller than the divided prediction block when the transformation division identifier indicates that the transformation block needs subdivision and the prediction block employs non-square division.

19. The decoding method according to claim 18, wherein the obtaining the multiple non-square transformation matrices smaller than the divided prediction block when the transformation division identifier indicates that the transformation block needs subdivision and the prediction block employs the non-square division comprises:

obtaining, when the prediction block is divided into horizontally arranged image subblocks of the same size, multiple non-square transformation blocks smaller than the divided prediction block, with width smaller than height; or obtaining, when the prediction block is divided into vertically arranged image subblocks of the same size, multiple non-square transformation blocks smaller than the divided prediction block, with width greater than height.

20. The decoding method according to claim 19, wherein the non-square transformation blocks are sequentially arranged horizontally or vertically in the prediction block of the division manner, or arranged zigzag in the prediction block of the division manner.

21. The decoding method according to claim 16, wherein the obtaining the identifier indicating to subdivide the transformation block of the prediction block, and obtaining the size of the transformation block of the prediction block according to the identifier and the division manner of the prediction block comprises:

obtaining, when the transformation division identifier indicates that the transformation block needs no subdivision, the size of the transformation block of the prediction block according to division hierarchy of the transformation and the division manner of the prediction block.

22. The decoding method according to claim 16, wherein when the transformation division identifier does not exist, the transforming unit does not need to perform further division.

23. The decoding method according to claim 16, wherein the obtaining the identifier indicating to subdivide the transformation block of the prediction block, and obtaining the size of the transformation block of the prediction block according to the identifier and the division manner of the prediction block comprises:
   indicating, by the transformation division identifier by default when the decoding object is divided into non-square prediction blocks whose width is unequal to height, that the transformation block needs no more division, wherein the size of the transformation block of the prediction block is the size of the prediction block under the division manner, and the transformation division identifier does not exist in the bitstream.

24. An encoding method with multiple image block division manners, comprising:
   determining a division manner of an encoding object in a current frame, wherein the division manner results in subblocks that are each one of a square image subblock or a rectangular image subblock;
   dividing the encoding object in the current frame to obtain first image subblocks whose width is unequal to height when the encoding object in the current frame employs non-square division;
   dividing ones of the first image subblocks, as individual subblocks by:
      horizontally dividing a one of the first image subblocks where a width of the one of the first image subblocks is greater than a height of the one of the first image subblocks; and
      vertically dividing the one of the first image subblocks where the width is less than the height; and
   writing an identifier indicating the image subblocks need subdivision into the bitstream.

25. The encoding method with multiple image block division manners according to claim 24, further comprising:
   writing division manner information, which indicates whether to perform irregular division for the encoding object in the current frame, into the bitstream.

26. A decoder for an image block, comprising:
   a non-transitory memory for storing computer executable instructions; and
   a processor operatively coupled to the memory, wherein the processor is configured to execute the computer-executable instructions to:
   determine that the image block needs to be divided by parsing a bitstream;
   obtain a division direction for the image block, wherein a size of the image block is expressed in W×H, with W representing a width of the image block and H representing a height of the image block;
   divide the image block based on the division direction, to obtain four rectangular image subblocks, wherein a size of each of the four rectangular image subblocks is W×H/4 or W/4×H; and
   reconstruct the image block based on the four rectangular image subblocks.

\* \* \* \* \*